United States Patent [19]

Saitoh

[11] Patent Number: 4,906,009
[45] Date of Patent: Mar. 6, 1990

[54] SEALING APPARATUS

[75] Inventor: Takayuki Saitoh, Fukushima, Japan

[73] Assignee: NOK Corporation, Tokyo, Japan

[21] Appl. No.: 213,330

[22] Filed: Jun. 30, 1988

[30] Foreign Application Priority Data

Jan. 29, 1988 [JP] Japan ............................... 63-11092[U]

[51] Int. Cl.[4] ............................................. F16C 33/78
[52] U.S. Cl. ........................................ 277/68; 277/92;
277/133; 277/134; 277/152
[58] Field of Search ................... 277/152, 134, 133, 25,
277/81 R, 95, 92, 67-69, 13.38, 153; 384/481,
484, 485, 486, 489

[56] References Cited

U.S. PATENT DOCUMENTS

| 1,931,733 | 10/1933 | Leibing | 277/68 |
|---|---|---|---|
| 2,478,140 | 8/1949 | Ulseth | 277/95 |
| 3,664,675 | 5/1972 | Malmstrom | 277/134 |
| 4,428,586 | 1/1984 | Romero | 277/25 |
| 4,441,722 | 4/1984 | Pichler | 277/134 |
| 4,516,783 | 5/1985 | Mitsue et al. | 277/152 |
| 4,531,746 | 7/1985 | Amdall et al. | 277/53 |
| 4,596,394 | 1/1986 | Schmitt | 277/152 |
| 4,632,404 | 12/1986 | Feldle et al. | 277/68 |
| 4,639,149 | 1/1987 | Bras et al. | 277/68 |
| 4,687,349 | 8/1987 | Pachuta | 277/95 |
| 4,721,312 | 1/1988 | Hornberger | 277/134 |
| 4,746,128 | 5/1988 | Freiwald | 277/152 |

FOREIGN PATENT DOCUMENTS

| 8102455 | 2/1980 | PCT Int'l Appl. | 277/95 |
|---|---|---|---|
| 2028440 | 3/1980 | United Kingdom | 277/95 |
| 2096716 | 10/1982 | United Kingdom | 277/95 |
| 2123498 | 2/1984 | United Kingdom | 277/133 |

Primary Examiner—William A. Cuchlinski, Jr.
Assistant Examiner—Jeffrey J. Hohenshell
Attorney, Agent, or Firm—Kenyon & Kenyon

[57] ABSTRACT

A sealing apparatus has a main body which is mounted on a housing and is provided with a sealing lip, and a rotary body mounted on a rotary shaft of a member with which the apparatus is combined. The rotary body extends in the radial direction of the rotary shaft and has one side surface which is in sliding contact with the sealing lip. The apparatus also has at least one projection member provided on that side surface of the rotary body on the radially outer side thereof.

12 Claims, 3 Drawing Sheets 4,906,009

SEALING APPARATUS

BACKGROUND OF THE INVENTION

The present invention relates to a sealing apparatus and, more particularly, to a sealing apparatus for component parts of a vehicle, particularly, for component parts of a tractor or the like which are rotatable in either of two directions.

Known sealing apparatuses of this type include a sealing apparatus as shown in FIG. 5A. The sealing apparatus 100 has the following construction. A rotary shaft 101 is rotatable in the direction of arrow, i.e. in the counter-clockwise direction, as viewed on the left side of the figure. A slinger 102 is fitted around the rotary shaft 101 and has a side surface 103 extending in the radial direction. The sealing apparatus 100 has a housing 104 on which a sealing apparatus main body 105 is mounted. A sealing lip 106 extends from the sealing apparatus main body 105 and is in sliding contact with a portion of the side surface 103 of the slinger 102, so as to seal oil which serves as a sealed fluid and which is on the B (right) side of the apparatus, as viewed in FIG. 5A. It is known in general that a sealing apparatus, such as the apparatus 100, in other words an end seal, does not possess the so-called pumping action, i.e., the action of sucking in air on the A (left) side of the apparatus, as viewed in FIG. 5A, to the sealed fluid (oil) side, to thereby prevent the oil from leaking. Therefore, it is general to provide a thread 107 on a portion of the side surface 103 of the slinger 102 so that air on the side A is forcibly sucked in by the apparatus (see FIG. 5B).

Japanese Utility Model Publication No. 55580/1982 discloses another conventional sealing apparatus, as shown in FIG. 6, in which a thread is also provided on a side surface of a slinger. According to this disclosure, a rotary shaft 111 is partitioned by a partitioning member 112 into the oil side B (the right side as viewed in FIG. 6) and the atmospheric air side A (the left side as viewed in the figure). A rotary member 115 is secured to the rotary shaft 111. A seal ring 116 is secured to the partitioning member 112 by means of a fixing member 117, and the tip 161 of the seal ring 116 is in contact with a side surface 151 which is at the tip of the rotary member 115 and is closer to the partitioning member 112. The fixing member 117 opposes a hook-shaped portion 152 of the rotary member 115 with a small gap 171 between, and it is provided with a groove 172 which is adjacent to the seal ring 116 and is recessed radially inward of the tip 161.

With the conventional sealing apparatus having the above-described construction, oil in the oil side B is sealed from the atmospheric air side A by virtue of the annular contact between the tip 161 of the seal ring 116 and the side surface 151 of the rotary member 115, the side surface being closer to the partitioning member 112.

The above-described prior art, however, encounters the following disadvantages. With the conventional sealing apparatus shown in FIGS. 5A and 5B, since the thread 107 is directed in such a manner as to allow air to be sucked in to the oil side when the rotary shaft 101 rotates in the above-mentioned counterclockwise direction, oil on the side B is sucked out when the rotary shaft 101 rotates in the opposite direction. Therefore, this sealing apparatus can be used only at locations where the direction of rotation is constant, for instance, at a location in an engine.

With the conventional sealing apparatus shown in FIG. 6, when the rotary shaft 111 remains stationary, oil may leak through the thread provided on the side surface of the slinger. In order to prevent this problem, an oil trap, such as the groove 172, has to be formed, thus causing an increase in the number of processes required for manufacturing the apparatus and an increase in production costs.

SUMMARY OF THE INVENTION

In order to solve the problems encountered by the prior art, it is an object of the present invention to provide a sealing apparatus which can be mounted on a rotary shaft rotatable in either of two directions and thus can be used at unlimited locations, and which is capable of preventing any oil leakage even when the rotary shaft remains stationary, the sealing apparatus thus having a high level of sealing performance and a wide range of applicability.

In order to achieve the above-stated and other objects of the present invention, a sealing apparatus in accordance with the present invention comprises a housing; a sealing apparatus main body mounted on the housing and provided with a sealing lip; a rotary body mounted on a rotary shaft of a member with which the apparatus is combined, the rotary body extending in the radial direction of the rotary shaft and having one side surface which is in sliding contact with the sealing lip; and a projection member provided on that side surface of the rotary body on the radially outer side thereof.

In the preferred embodiments of the present invention, the projection has a pentahedral or tetrahedral configuration and has faces disposed in bilateral symmetry. A plurality of projection members may be provided on the radially outer peripheral portion of the side surface of the rotary body. The projection member may be provided on either the inner or outer side surface of the rotary body.

Thus, with the sealing apparatus in accordance with the present invention, at least one projection member is provided on the outer peripheral portion of one side surface of the rotary body and is adapted to shunt part of the sealed fluid radially outward. The lateral faces of the projection members act to shunt part of the sealed fluid by centrifugal force during the rotation of the rotary body. This arrangement eliminates the need for the provision of any thread on the side surface of the rotary body, thereby eliminating any limitation of use imposed by the direction in which the thread rotates, and also preventing any leakage of the sealed fluid through the thread when the shaft remains stationary.

DESCRIPTION OF THE PREFERRED EMBODIMENTS

The present invention will be described hereunder with respect to the illustrated embodiments thereof.

Figure 1A:
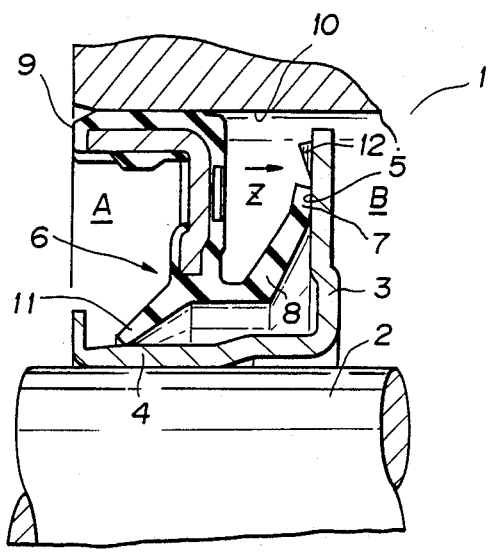
FIG. 1A is a fragmentary sectional view of a sealing apparatus in accordance with a first embodiment of the present invention, sectioned through a plane including the axis of the rotary shaft associated.
Figure 1B:
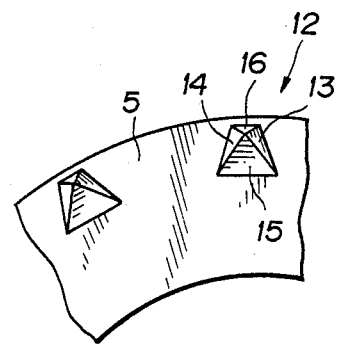
FIG. 1B is a fragmentary plan view of a rotary body of the sealing apparatus shown in FIG. 1A, which is taken in the direction Z shown in FIG. 1A.
Figure 2:
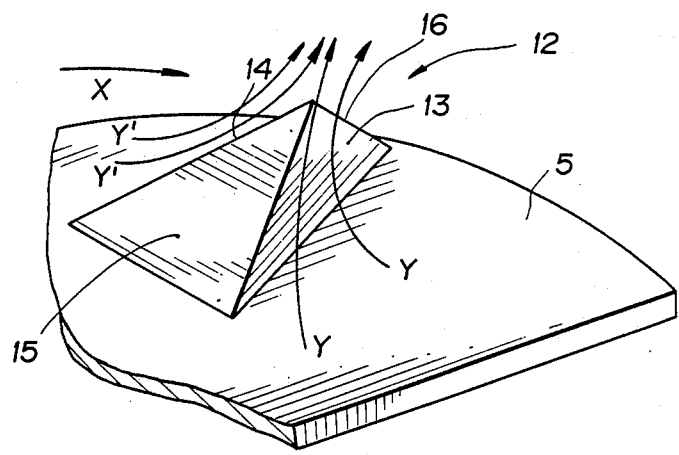
FIG. 2 is a perspective view of a projection provided on a slinger serving as the rotary body.

FIGS. 1A, 1B and 2 illustrate a sealing apparatus 1 in accordance with a first embodiment of the present invention. The sealing apparatus 1 has a slinger 3 which is fixed to a rotary shaft 2 and serves as a rotary body. The slinger 3, serving as a rotary body, has its cylindrical portion 4 fixed to the rotary shaft 2, while its tip portion is bent in the radial direction to provide a side surface. The tip of this bent portion opposes a housing 10 of the apparatus 1 with a gap between.

The apparatus 1 further has a sealing apparatus main body 6 which in turn as a lip tip 7 that acts to prevent any leakage of the fluid. The lip tip 7 is connected to a sealing lip portion 8 of the main body 6, and the portion 8 acts to reduce the level of influence on the lip tip 7 by vibration of the associated machine and reduce variation in pressure so that the lip tip 7 is kept in its stable contact condition. The sealing apparatus main body 6 also has a fitting portion 9 which is provided radially outward of the sealing lip portion 8 and forms an outer peripheral portion of the main body 6. The fitting portion 9 acts to fix in place the sealing apparatus main body 6 within the housing 10 as well as to prevent any leakage through the gap between the surfaces of contact between the inner surface of the housing 10 and the outer peripheral surface of the main body 6. The lip tip 7 has a wedge-shaped section and presses adequately against the mating portion of the inner side surface 5 of the slinger 3, so as to seal the fluid on the B (right) side as viewed in FIG. 1A. The width of contact of the lip tip 7 with the inner side surface 5 portion is relatively small, and the force by which the lip tip 7 presses against the side surface 5 portion as well as the material forming the sealing lip portion 8 determines the ability of sealing the fluid. The sealing lip portion 8 is mainly formed of rubber and its configuration determines the pressing force of the lip tip 7 generated by the circumferential extension and bending of the lip.

The sealing apparatus main body 6 further has a dust lip 11 on the atmospheric air side of the sealing lip portion 8 (i.e., the side A on the left side as viewed in FIG. 1A). The dust lip 11 is a portion of the main body 6 which acts to prevent any penetration of dust from the exterior. The dust lip 11 is an auxiliary lip which is smaller than the sealing lip portion 8, and its tip is in contact with the radially outer peripheral surface of the cylindrical portion 4 of the slinger 3.

Further, according to this embodiment of the present invention, projections 12 are provided on the inner side surface 5 of the slinger 3 at locations which are radially outward of the portion of contact at which the lip tip 7 is in sliding contact with the side surface 5. Each of the projections 12 has a pentahedral or tetrahedral configuration, with its bottom face connected to the locations of the side surface 5 of the slinger 3. Accordingly, four faces 13 to 16 (in case of tetrahedral configuration, three faces 13 to 15) of each projection 12 project from the side surface 5, with the lateral faces 13 and 14 directed in the circumferential direction while the inner face 15 directed to the center of rotation and the outer face 16 directed in the radially outward direction (in case of tetrahedral configuration, the outer face 16 does not exist). Thus, the projections 12 are provided around the entire circumference of the slinger at suitable intervals. The sealing apparatus 1 having the projections 12 of the above-described construction operates in the following manner.

With the rotation of the rotary shaft 2, the slinger 3 mounted on the rotary shaft 2 rotates. The projections 12 provided on the slinger 3 rotate as the slinger 3 rotates. If it is assumed that the slinger 3 rotates in the direction X indicated by the arrow shown in FIG. 2, part of the fluid, e.g. oil, in the vicinity of each projection 12 is subjected to the pump-blade-like action of the circumferentially-directed lateral face 13 of each projection 12 so as to be shunted toward the outer periphery of the slinger 3. The directions in which part of the oil is shunted are indicated by arrows Y in FIG. 2. In this way, that part of oil is kept from reaching the portion of contact between the lip tip 7 of the sealing lip portion 8 and the inner side surface 5 portion. Each projection 12 is bilaterally symmetrical with respect to its center line. If the slinger 3 rotates in the direction X, the lateral faces 13 shunt part of the oil in the direction Y, whereas, if the the slinger 3 rotates in the direction opposite to the direction X, the other lateral faces 14 shunt part of the oil in the direction indicated by arrows Y'. Thus, by virtue of the pentahedral or tetrahedral configuration of each of the projections 12 that is symmetrical in the direction of rotation, the same effect can be provided with respect to the rotation of the slinger in either of two directions.

Figure 3:
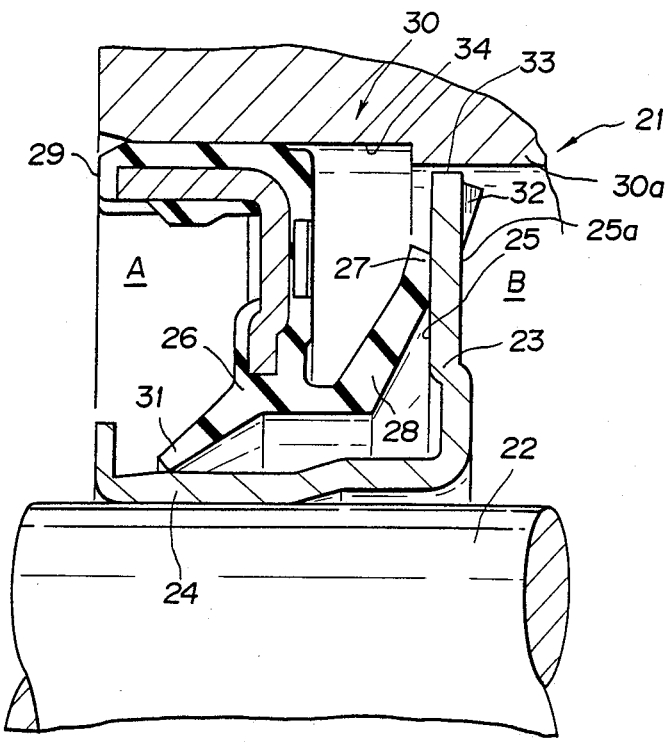
FIG. 3 is a fragmentary sectional view corresponding to FIG. 1A, which illustrates a sealing apparatus in accordance with a second embodiment of the present invention.

FIG. 3 illustrates a sealing apparatus in accordance with a second embodiment of the present invention. A sealing apparatus 21 in accordance with this embodiment has a slinger 23 which is fixed to a rotary shaft 22 and serves as a rotary body. The slinger 23, serving as a rotary body, has its cylindrical portion 24 fixed to the rotary shaft 22 while its tip portion is bent in the radial direction to provide a side surface.

A main body 26 of the sealing apparatus 21 has a lip tip 27 which acts to prevent any leakage of the fluid (e.g., oil). The lip tip 27 is connected to a sealing lip portion 28 of the main body 26. The sealing apparatus main body 26 also has a fitting portion 29 which is provided radially outward of the sealing lip portion 28 and forms an outer peripheral portion of the main body 26. The fitting portion 29 acts to fix in place the sealing apparatus main body 26 in a cavity 34 of a housing 30 as well as to prevent any leakage through the gap between the surfaces of contact between the inner surface of the housing cavity 34 and the outer peripheral surface of the main body 26. The lip tip 27 has a wedge-shaped section and presses adequately against the mating portion of the inner side surface 25 of the slinger 23 to seal the fluid on the side B as viewed in FIG. 3. Further, a dust lip 31 is provided on the atmospheric air side of the sealing lip portion 28 (i.e., the side A as viewed in FIG. 3), and it acts as a portion of the main body 26 to prevent any penetration of dust from the exterior.

According to this embodiment, at least one projection 32 is provided at a radially outer peripheral portion 25a of the outer side surface of the rotary body 23 that is on the sealed fluid side B of the rotary body 23.

Further, the housing 30 is provided with an inner stepped portion 30a, so as to make the gap 33 between the housing 30 and the outer edge of the rotary body 23 small.

With the sealing apparatus having the above-described construction, when the rotary body 23 rotates, the projection 32 shunts part of the oil and, in addition, the narrow gap 33 prevents that oil from entering into the cavity 34. In consequence, the oil is kept from flowing to the vicinity of the lip tip 27 of the sealing lip portion 28, thereby maintaining the sealing performance.

Figure 4:
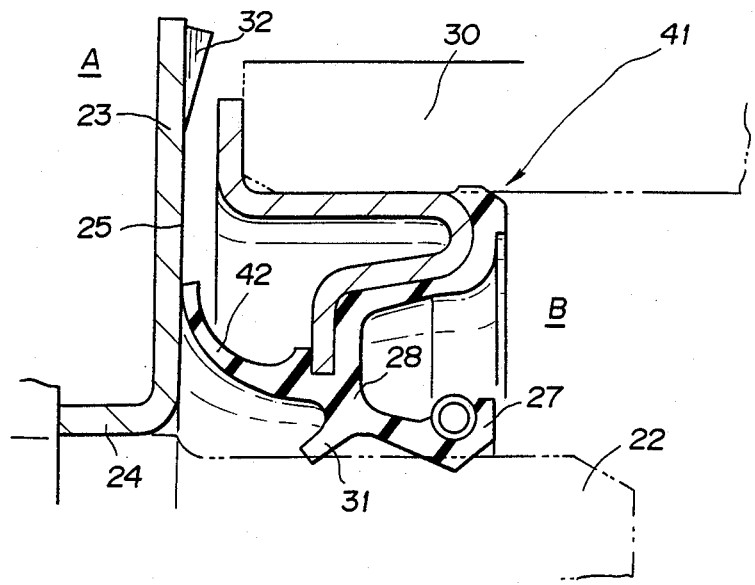
FIG. 4 is a fragmentary sectional view corresponding to FIG. 1A, which illustrates a sealing apparatus in accordance with a third embodiment of the present invention.
Figures 5A, 5B:
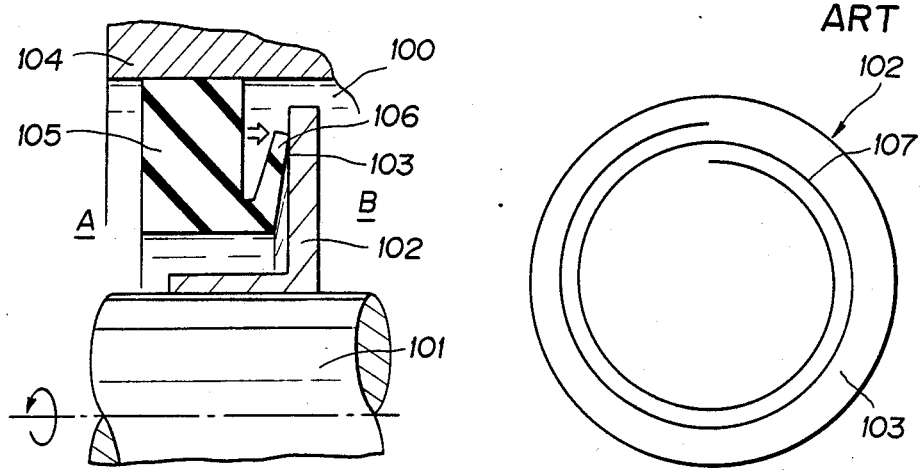
FIG. 5A is a fragmentary sectional view corresponding to FIG. 1A, which illustrates a conventional sealing apparatus.
FIG. 5B is a plan view of a slinger serving as a rotary body of the conventional apparatus shown in FIG. 5A.
Figure 6:
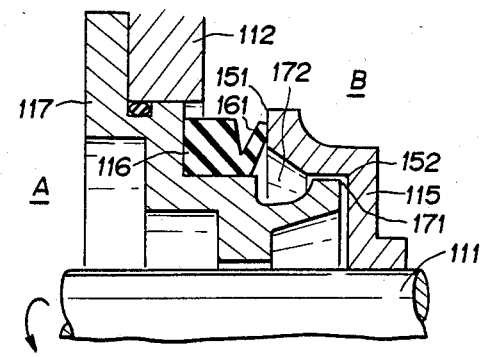
FIG. 6 is a fragmentary sectional view corresponding to FIG. 1A, which illustrates another conventional sealing apparatus.

FIG. 4 illustrates a third embodiment of the present invention. A sealing apparatus 41 in accordance with this embodiment is applicable to a location which is exposed to muddy water or the like. The sealing apparatus 41 has a side lip 42 which is one kind of a sealing lip. The side lip 42 is in sliding contact with the side surface 25 of a rotary body 23 of the apparatus 41 that is on an oil side (the side B as viewed in FIG. 4). At least one projection 32 is provided at a radially outer peripheral portion on the oil side of the rotary body 23. With the above-described construction of the sealing apparatus 41, when the rotary body 23 rotates, the projection 32 acts to shunt any muddy water coming from the atmospheric air side (the side A as viewed in FIG. 4), thereby preventing the muddy water from flowing to the side lip 42.

Thus, according to the present invention, the projections 12 or 32 act to shunt part of a fluid. Therefore, no fluid is permitted to reach the sealing portion, thereby preventing-leakage of oil or penetration of muddy water.

As described above, with the sealing apparatus of the present invention, at least one projection is provided on the radially outer peripheral portion of one side surface of the rotary body for shunting part of a fluid radially outward. By virtue of this arrangement, it is not necessary to provide any thread in the rotary body, in contrast with the prior art, thereby eliminating the risk of any oil leaking when the rotary body remains stationary, and thus improving the sealing performance of the apparatus. Further, the sealing apparatus of the present invention can be used with the rotation of the rotary body in either of the two directions and, in this respect, the sealing apparatus is free from any limitation concerning the location of its use.

It is to be understood that the present invention is not limited to the foregoing embodiments, and various changes and modifications which can be made are included in the scope of the present invention. For instance, the configuration of the projection is not limited to the pentahedral or the tetrahedral configuration, and another may be used so long as the similar effect is provided.

I claim:

1. A sealing apparatus comprising:
a housing;
a sealing apparatus main body mounted on said housing and provided with a sealing lip;
a rotary body mounted on a rotary shaft of a member with which said apparatus is combined, said rotary body extending in a radial direction of said rotary shaft and having one side surface which is in sliding contact with said sealing lip; and
a projection member provided on an inner side surface of said rotary body at a location radially outward of a tip portion of said sealing lip, said projection member having a pentahedral configuration having faces disposed in bilateral symmetry.

2. A sealing apparatus according to claim 1 having a plurality of said projection members.

3. A sealing apparatus comprising:
a housing;
a sealing apparatus main body mounted on said housing and provided with a sealing lip;
a rotary body mounted on a rotary shaft of a member with which said apparatus is combined, said rotary body extending in a radial direction of said rotary shaft and having one side surface which is in sliding contact with said sealing lip; and
a projection member provided on an inner side surface of said rotary body at a location radially outward of a tip portion of said sealing lip, said projection member having a tetrahedral configuration having faces disposed in bilateral symmetry.

4. A sealing apparatus according to claim 3 having a plurality of said projection members.

5. A sealing apparatus comprising:
a housing;
a sealing apparatus main body mounted on said housing and provided with a sealing lip;
a rotary body mounted on a rotary shaft of a member with which said apparatus is combined, said rotary body extending in a radial direction of said rotary shaft and having one side surface which is in sliding contact with said sealing lip; and
a projection member provided on an outer side surface of said rotary body at a location outward of a tip portion of said sealing lip, said projection member having a pentahedral configuration having faces disposed in bilateral symmetry.

6. A sealing apparatus according to claim 5 having a plurality of said projection of said projection members.

7. A sealing apparatus according to claim 5 wherein there is a gap between an outer edge of the side of said rotary body and an inner wall of said housing, said apparatus further including means for reducing the size of said gap.

8. A sealing apparatus according to claim 7 wherein said means for reducing the size of said gap comprises the surface of said housing that opposes the outer edge of the side of said rotary body being formed with a stepped portion.

9. A sealing apparatus comprising:
a housing;
a sealing apparatus main body mounted on said housing and provided with a sealing lip;
a rotary body mounted on a rotary shaft of a member with which said apparatus is combined, said rotary body extending in a radial direction of said rotary shaft and having one side surface which is in sliding contact with said sealing lip; and
a projection member provided on an outer side surface of said rotary body at a location radially outward of a tip portion of said sealing lip, said projection member having a tetrahedral configuration having faces disposed in bilateral symmetry.

10. A sealing apparatus according to claim 9 having a plurality of said projection members.

11. A sealing apparatus according to claim 9 wherein there is a gap between an outer edge of the side of said rotary body and an inner wall of said housing, said apparatus further including means for reducing the size of said gap.

12. A sealing apparatus according to claim 11 wherein said means for reducing the size of said gap comprises the surface of said housing that opposes the outer edge of the side of said rotary body being formed with a stepped portion.

* * * * *